Nov. 29, 1938.   E. A. NELSON   2,138,114
MOTOR VEHICLE
Filed July 23, 1936   2 Sheets-Sheet 1
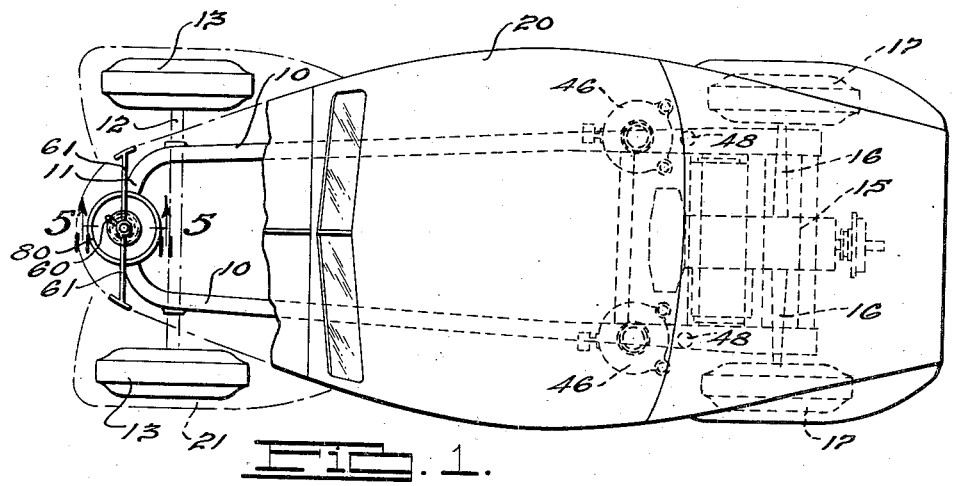
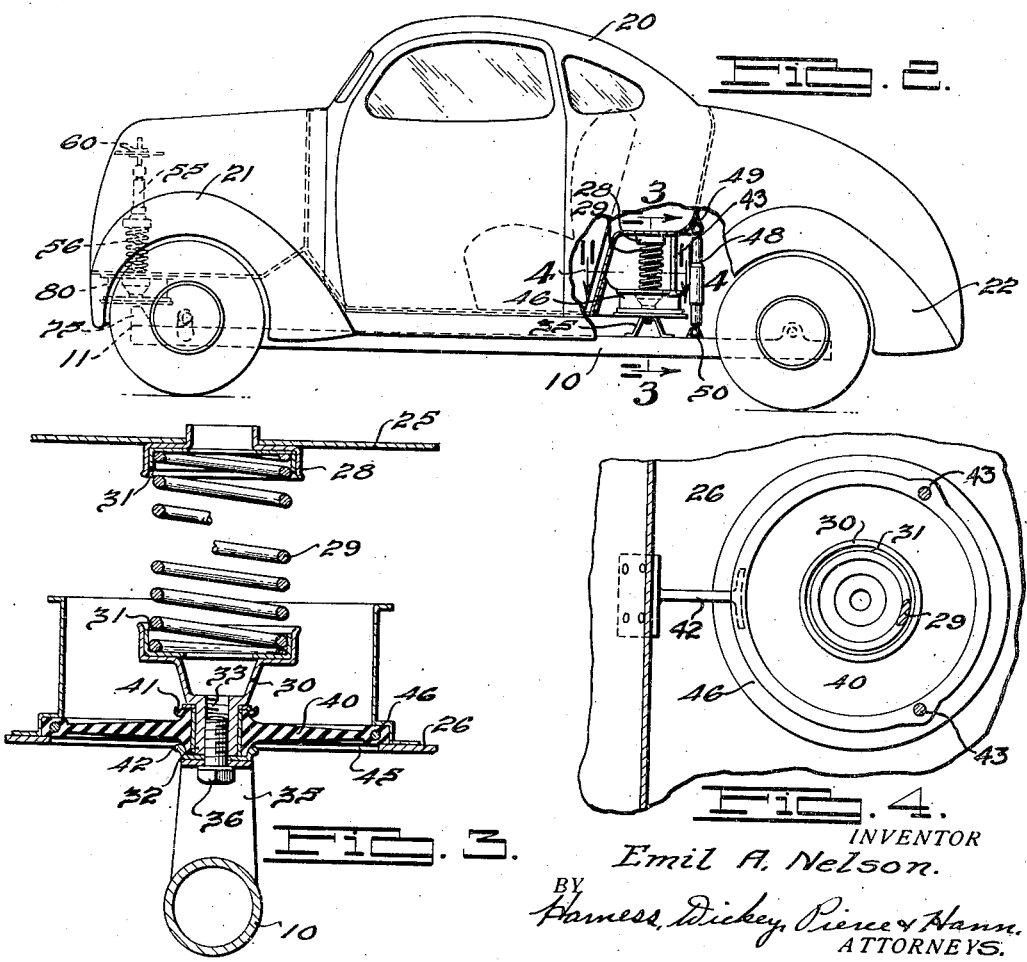
INVENTOR
Emil A. Nelson.
BY Harness, Dickey, Pierce & Hann.
ATTORNEYS.

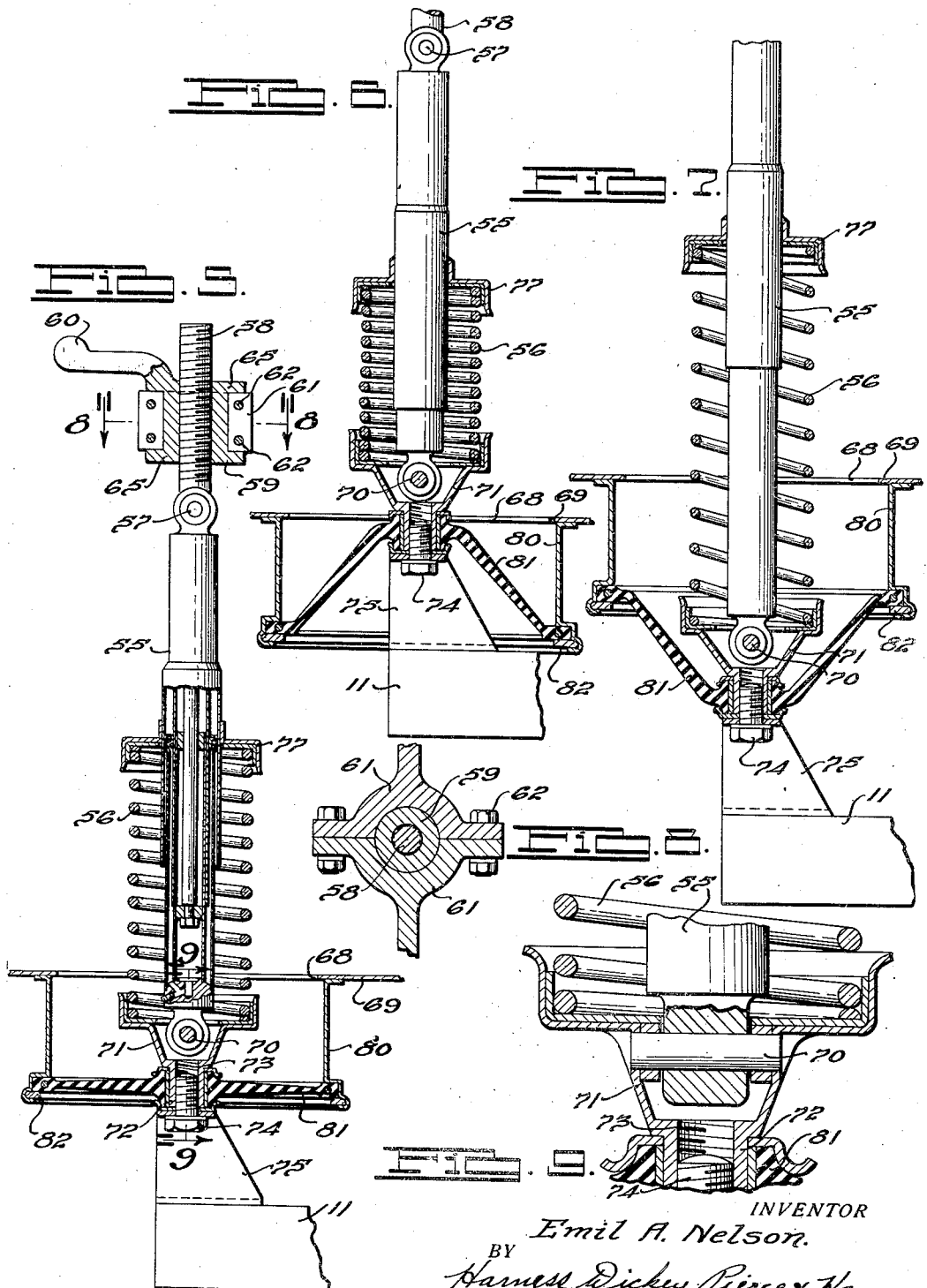

Patented Nov. 29, 1938

2,138,114

UNITED STATES PATENT OFFICE 2,138,114

MOTOR VEHICLE

Emil A. Nelson, St. Clair Shores, Mich., assignor of one-half to Dubois Young and one-fourth to Frank W. Gay Application July 23, 1936, Serial No. 92,076

11 Claims. (Cl. 296—35)

This invention relates to motor vehicles, and particularly to a means for suspending a vehicle body with respect to the ground wheels so as to provide an easy and comfortable ride for the passengers of the vehicle.

Objects of the invention include the provision of means for suspending the body of a motor vehicle with respect to the frame thereof whereby to permit the body to readily yield relative to the frame of the vehicle under the effects of shocks and the like transmitted to the ground wheels of the vehicle; the provision of a construction which will permit the body of the vehicle to yield in all directions with respect to the chassis frame; the provision of means for suspending a vehicle body upon a vehicle chassis frame in which relatively readily yieldable rubber means serve as substantially the sole means for maintaining the position of the vehicle body longitudinally and laterally with respect to the chassis frame and yieldable means in addition thereto are provided for resiliently mounting the vehicle body for relative vertical movement with respect to the chassis frame; the provision of a novel resilient support between a pair of relatively movable members; the provision of a relatively movable resilient support between a pair of relatively movable members including a shock absorbing element; and the provision of a new and novel spring suspension for motor vehicles.

Other objects of the invention include the provision of means in a motor vehicle for leveling up the body of the vehicle with respect to the wheels under varying load conditions; the provision of readily adjustable means which will permit the body of a vehicle to be adjusted in height in order to bring the body to a normally level condition regardless of load distribution in the body; and the provision of a rear engine motor vehicle having a covered compartment at the forward end thereof provided with a removable cover and means exposed upon opening the cover for trimming the level of the body with respect to the wheels.

The above being among the objects of the present invention, the same consists of certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Figure 1 is a more or less diagrammatic, partially broken plan view of a motor vehicle illustrating a suitable embodiment of the present invention incorporated therein;

Fig. 2 is a partially broken, partially sectioned side elevational view of the motor vehicle shown in Fig. 1;

Fig. 3 is an enlarged fragmentary vertical sectional view, taken centrally through one of the spring suspension units as on the line 3—3 of Fig. 2;

Fig. 4 is an enlarged fragmentary horizontal sectional view through one of the spring suspension units, taken as on the line 4—4 of Fig. 2;

Fig. 5 is an enlarged vertical sectional view, taken on the line 5—5 of Fig. 1, centrally through the front spring suspension unit showing the parts in their normal position;

Fig. 6 is a fragmentary view similar to that shown in Fig. 5 but illustrating the parts in the position which they assume when the vehicle is heavily loaded or when the spring is compressed through the vehicle striking an obstruction or bump in the road;

Fig. 7 is a view similar to Figs. 5 and 6 but illustrating the position which the parts assume as, for instance, when the wheels of the vehicle drop into a hole or depression in the road and cause the spring of the unit to distend or elongate;

Fig. 8 is an enlarged horizontal sectional view, taken on the line 8—8 of Fig. 5;

Fig. 9 is an enlarged fragmentary vertical sectional view, taken on the line 9—9 of Fig. 5 and illustrating the connection between the lower end of the shock absorbing element and the coacting bracket on the chassis frame of the vehicle.

Spring suspension units constructed in substantial accordance with the invention disclosed herein are applicable to a relatively wide number of uses wherein it is desired to resiliently connect a pair of relatively movable parts. The units under consideration are particularly adapted for use in connection with the spring suspension of motor vehicles and in this connection may be employed either between the usual axles or equivalent means and the chassis frame of the vehicle, or may be employed between the chassis frame and the body itself; it is shown primarily as a matter of illustration in the latter position and in which position certain further advantages of the construction are realized.

From the foregoing it will be readily understood that, while the following description is directed to the specific construction illustrated in the drawings and describes a spring suspension unit particularly adapted for use in connection with automotive vehicles, the generic inventive concept presented in this application is, upon reasonable modification, considerably broader in scope.

The particular specific embodiment of the invention illustrated in the drawings includes a relatively rigid chassis comprising longitudinally extending frame members 10 which may conveniently be connected together at their forward ends by a transversely extending arcuately shaped brace member 11. These frame members 10 serve to provide means for directly mounting a front axle 12 rigidly therewith, which front axle serves to support front wheels 13. The particular form of the invention shown discloses a vehicle body adapted for the installation of an engine or motor power unit 15 in the rear thereof, which motor power unit is preferably directly supported on the frame members 10 and serves, by means of axles 16, to drive the rear wheels 17. The vehicle is provided with a body generally designated as 20 which is of substantially unitary construction and includes front fenders 21 and rear fenders 22 suitably secured thereto.

The apparatus of the present invention is primarily adapted for providing a resilient mounting for the body 20 upon the chassis 10 in such a manner that the body will be permitted to move vertically, longitudinally and laterally and that such movements will be normally resiliently limited by means of the spring suspension of the present invention. Inasmuch as both the body and the chassis are relatively rigid unitary structures, it will be readily appreciated that the particular disposition of the resilient supports which serve to form the interconnection between the body and the chassis is not particularly important and, consequently, by way of illustration, the construction disclosed illustrates a vehicle in which a three-point suspension is used having a pair of resilient supports located at the rear of the driver's compartment and a single support disposed at the forward end of the vehicle.

One of these supporting members is clearly illustrated in Figs. 3 and 4 of the drawings. By reference to these figures it will be seen that the body of the vehicle is of such conformation and construction at the portion thereof at the rear of the driver's compartment that upper and lower substantially horizontally extending panels 25 and 26 are provided, which panels are both rigidly connected to the body as a whole and are therefore maintained in predetermined spaced relation with respect to each other. It will of course be readily appreciated that while these members 25 and 26 are illustrated in the drawings as sheet metal panels, any two vertically spaced, relatively rigid supports are all that are required for mounting the improved suspension apparatus of the present invention.

A cup-shaped member 28 may conveniently be mounted in a suitable aperture in the upper panel 25 and it will be seen that this cup-shaped member serves to receive the upper end of a helical coil spring 29, the lower end of which is received in an upwardly presenting cup-shaped member 30, the construction of which is described in detail below. In order to accurately position the ends of the coil spring member 29 in the cup-shaped members 28 and 30, suitable washers 31 may be disposed over the ends of the spring, these washers being of such configuration that they seat tightly within the cup-shaped members and serve to position the spring 29 concentrically therewith.

The lower cup-shaped member 30 is preferably provided with an integral axially extending projection 32, the exterior of which is of generally cylindrical configuration and which is provided with an axially extending internally threaded bore 33. The longitudinally extending frame member 10 which is illustrated as being of hollow tubular construction, has permanently secured thereto a bracket member 35, which bracket member has an aperture in the central portion thereof adapted to permit the passage of a bolt 36 therethrough, which bolt is threadably received within the bore 33 in the cup-shaped member 30.

It will be clear from the foregoing that the cup-shaped member 28 serves to retain the upper end of the compression coil spring 29 and support the same rigidly with respect to the body 20 of the vehicle. The lower end of the coil spring is received within the cup-shaped member 30 which, as has been explained, is rigidly connected to the frame member 10 of the chassis. It will be therefore readily appreciated that the spring 29 serves to resiliently support the body upon the chassis and permit relative vertical as well as longitudinal and lateral movement of the body with respect to the chassis.

It has been found that in the absence of specific means for limiting the longitudinal and transverse relative movements of the body with respect to the chassis, the spring suspension shown in Fig. 3 is adequate to properly support the body under the stresses to which it is subjected in normal use. Consequently, the invention contemplates the provision of means in addition to the coil spring assembly described above for resiliently limiting relative transverse or longitudinal movements of the body and chassis. One particularly effective manner in which this latter end is accomplished is illustrated in Fig. 3.

A molded resilient annulus 40 is provided, which annulus has a central aperture adapted to closely surround the cylindrical outer surface of the axial projection 32 on the lower cup-shaped member 30. This central portion of the annulus is preferably retained in engagement with this projection by means of cup-shaped washers 41 and 42 which engage suitable flanges on either side of the surface of the annulus adjacent the central aperture therein, which washers are retained in position by means of the bolt 36 which serves to secure the bracket 35 to the cup-shaped member 30.

The lower panel 26 is provided with a relatively large, generally circular aperture 45 therein through which aperture the spring suspension passes. The peripheral edge of the resilient annulus 40 is permanently secured to the marginal edge of the opening 45 by means of a generally cylindrical stamping 46 which serves to clamp the marginal edge of the annulus against the surface of the panel 26 adjacent the marginal edge of the aperture.

As is clearly seen by reference to Figs. 2 and 4 auxiliary bracing means may be used, if desired, for rigidly supporting the collar 46 with respect to the upper panel 25. This brace means may include a bracket 42 secured to the panel 25 and to one side of the collar 46. The opposite side of the collar may be supported by a pair of vertically extending rods or pillars 43 interconnecting the same with the upper panel 25.

The various members making up the assembly described above are preferably so proportioned and arranged with respect to each other that when the vehicle body is carrying a normal load, the rubber annulus 40 will lie substantially in a horizontal plane as shown. It will be appreciated that this rubber annulus 40 serves to utilize both the forces of tension and compression therein in order to resiliently limit relative transverse and longitudinal movements of the body with respect to the chassis and tends constantly to maintain the spring 29 in axial alignment with the bracket 35 upon which it is supported.

As is conventional in automotive vehicle constructions, it has been found preferable to utilize a shock absorber for dampening the relative vertical movements between the body and the chassis and therefore in Fig. 2 is shown a conventional telescopic shock absorber 48 which is pivotally connected to the body at its upper end by means of a bracket 49 and pivotally connected to the chassis 10 at its lower end by means of a bracket 50. While the spring suspension illustrated in Figs. 3 and 4 shows but one of the units, one of which is located on either side of the vehicle body in the rear of the driver's compartment, it will be readily understood that both of these suspensions may be substantially identical in construction and each provided with a shock absorber in order that they may conveniently serve to support the rear portion of the body at each of the lateral sides thereof, and it will be clearly understood that the two spring suspensions together with their shock absorbers will serve to operate substantially independently of one another.

The suspension construction at the front of the vehicle is of substantially modified form and is preferably disposed adjacent the forward end of the body and medially spaced between the front wheels. In this form of spring suspension a shock absorber 55 extends axially through the center of a helical coil spring 56 which serves to support the forward end of the body, and the shock absorber serves in part to provide means for mounting the spring in position. The shock absorber is pivotally connected at 57 at its upper end to an externally threaded rod 58. The rod 58 threadably receives a shouldered collar 59 which is provided with a handle or arm 60 to provide convenient manual means for effecting rotation of the collar. This collar is mounted for rotation between a pair of transversely extending brace members 61 which are bolted together by means of bolts 62 and which are recessed in their adjacent faces to together provide a cylindrical bore in which the collar is free to rotate. It will be appreciated that the collar 59 is provided with shoulders or flanges 65 in its upper and lower ends which serve to preclude axial movement of the collar with respect to the brace members in which it is mounted and yet permit free rotation thereof therein.

The shock absorber 55 is of conventional telescopic construction and the specific interior arrangement of parts thereof forms no part of the present invention, it being appreciated that any suitable telescopic type of shock absorber may conveniently be used in the structure disclosed without departing from the scope of the present invention. The shock absorber extends downwardly through a relatively large circular aperture 68 formed in a horizontally extending panel 69 which is mounted rigidly with respect to the body of the vehicle and consequently is fixedly positioned with respect to the brace members 61. The lower end of the shock absorber 55 is pivotally connected by means of a pivot pin 70 to a cup-shaped spring receiving casting 71 somewhat similar in construction to the cup-shaped member 30 described above. This cup-shaped member 71 has an axial projection 72 which is generally cylindrical in configuration and is provided with an axial internally threaded bore 73 adapted to receive a bolt 74 for securing the cup-shaped member rigidly with respect to a bracket 75 mounted on the forward portion of the chassis frame. The cup-shaped member is adapted to receive the lower end of the helical coil spring 56 and the upper end of this spring is received in a cup-shaped member 77 which is permanently secured to the exterior surface of the shock absorber 55. It will therefore be clear that the spring 56 is confined between these two cup-shaped members and serves to resiliently mount the body upon the chassis of the vehicle and that the shock absorber serves to dampen relative movement between these members. In order to limit relative lateral and longitudinal movements of the body with respect to the chassis, a substantially cylindrical housing 80 is permanently secured to the under side of the horizontal extending panel 69 at the marginal edge of the aperture 68 therein. This cylindrical housing is provided with a shouldered recess in its lower end which is adapted to receive the outer peripheral edge of a rubber annulus 81 substantially similar in construction to the annulus 40 described above. The outer edge of this annulus may conveniently be retained in position by a split ring 82 or any other suitable means. This annulus 81 is in its central portion secured to the projection 72 on the lower cup-shaped member 71 substantially in the same manner as has been described above.

It will be readily appreciated from the foregoing that the function of the spring suspension shown in Fig. 5 is substantially the same as that disclosed in Figs. 3 and 4, except for the fact that the shock absorber in this particular installation is located concentrically with respect to the spring with which it cooperates and serves to provide means for supporting the upper end of the spring. Further, it will be clear that as the collar 59 is rotated by means of the handle 60, the vertical position of the body with respect to the chassis may be conveniently regulated. This spring suspension unit is constructed and arranged in such a manner that when the vehicle is normally loaded, the rubber annulus 81 will lie substantially in a horizontal plane. It will be clear by reference to Fig. 6 that when additional loads are imposed upon the vehicle or when shocks are transmitted to the chassis of such nature that the chassis moves upwardly with respect to the body, the spring 56 will be compressed and the parts will assume substantially the position illustrated in Fig. 6. Conversely, when the load in the vehicle is lightened or for any other reason the body is moved upwardly with respect to the chassis, the spring 56 will expand and the parts will assume substantially the position illustrated in Fig. 7. It will be readily understood that, irrespective of whether the parts are in the position shown in Fig. 5 or in the position shown in Figs. 6 and 7, the rubber annulus will serve to resiliently limit lateral or longitudinal movements of the body with respect to the chassis.

While it will be readily appreciated that all three of the spring suspension units shown may be conveniently provided with means for regulating the vertical position of the body with respect to the chassis, it has been found that when a single unit is utilized at the front of the vehicle for supporting the body on the chassis, the body as a whole may be conveniently leveled by adjustment at this one point. Further, it will be appreciated that if it is so desired, the spring suspension unit at the rear of the vehicle may conveniently be of substantially similar construction to that shown in Figs. 5, 6 and 7, that is, with the shock absorber unit located concentrically with respect to the helical coil spring.

While it will be understood that the embodiments of the invention disclosed in the accompanying drawings and described above are relatively detailed and specific, it will be readily understood that these embodiments are merely illustrative of the generic inventive concept presented. Many other and further modifications thereof falling within the scope of the invention as defined in the subjoined claims will be apparent to those skilled in the art.

I claim as my invention:

1. In a vehicle having a body and chassis, a spring resiliently interconnecting the same for relative vertical movement, and resilient means mounted in surrounding relation to said spring fixedly connected to both said body and said chassis for resiliently controlling relative lateral movement therebetween independently of said spring.

2. In a vehicle having a body and chassis, a vertically disposed compression coil spring interconnecting the same, and resilient means mounted in surrounding relation to said spring fixed to said chassis adjacent the point of securement of said spring and fixed to said body resiliently limiting relative lateral movement between said chassis and body independently of said spring and resisting excessive vertical movement between them in at least one direction.

3. In a vehicle having a chassis and a body, a vertically disposed helical coil spring resiliently interconnecting the same, a shock absorber disposed interiorly of said spring further interconnecting the same, and means independent of said spring and shock absorber for resiliently limiting relative lateral movement between said chassis and body.

4. In a vehicle having a body and a chassis, a pair of vertically spaced supports mounted rigidly with respect to said body and disposed above said chassis, a compression coil spring secured at its upper end to the upper of said supports and at its lower end to said chassis to resiliently interconnect said body and chassis for relative vertical movement, and resilient means interconnecting said chassis and the lower of said supports so constructed and arranged as to control relative lateral movement between said body and chassis in all horizontal directions.

5. In a vehicle having a body and a chassis, a pair of vertically spaced supports mounted rigidly with respect to said body and disposed above said chassis, a compression coil spring secured at its upper end to the upper of said supports and at its lower end to said chassis to resiliently interconnect said body and chassis, and a rubber member fixed to both said chassis and the lower of said supports to resiliently limit relative lateral movement between said body and chassis.

6. In a vehicle having a body and a chassis, a pair of vertically spaced supports mounted rigidly with respect to said body, a compression coil spring secured at its upper end to the upper of said supports and at its lower end to said chassis for resiliently interconnecting said body and chassis, said lower support having an aperture through which said spring is adapted to pass, and a resilient member fixed to both the marginal edge of said aperture and to said chassis to resiliently limit relative movement between said body and chassis in all lateral directions and serving to restrain excessive vertical movement between said body and chassis.

7. In a vehicle having a body and a chassis, a pair of vertically spaced supports mounted rigidly with respect to said body, a telescopic shock absorber having its upper end connected to said upper support and its lower end connected to said chassis, a helical coil spring surrounding said shock absorber having its upper end connected to the upper end thereof, and a resilient annulus interconnecting the lower end of said spring and shock absorber and said lower support member to resiliently resist relative lateral movement between said body and chassis.

8. In a vehicle having a body and a chassis, a plurality of spring suspension units for resiliently supporting said body on said chassis, each of said units including a spring, and means independent of said spring for limiting relative transverse movements between said body and chassis, and means associated with one of said units for varying the spacing between said body and chassis to level the former with respect to the latter.

9. In a vehicle having a body and a chassis, a plurality of spring suspension units for resiliently supporting said body on said chassis, each of said units including a spring and means independent of said spring for limiting relative transverse movements between said body and chassis, and adjustable means for connecting one of said spring suspension units to said body to level the same with respect to said chassis.

10. In a vehicle having a body and a chassis, a plurality of spring suspension units for resiliently supporting said body on said chassis, means associated with each of said units for resiliently limiting relative transverse movement between said body and chassis, and adjustable means for connecting one of said units to said body to level the same with respect to said chassis.

11. In a vehicle having a body and a chassis, a plurality of spring suspension units for resiliently supporting said body on said chassis, means associated with each of said units for resiliently limiting relative transverse movement between said body and chassis, and adjustable means for connecting one of said units to said body to level the same with respect to said chassis, said adjustable means including a collar rotatably mounted in said body and threadably mounted on a portion of said unit.

EMIL A. NELSON.